US006851331B2

United States Patent
Kuroumaru et al.

(10) Patent No.: US 6,851,331 B2
(45) Date of Patent: Feb. 8, 2005

(54) TILT STEERING APPARATUS

(75) Inventors: Yoshikazu Kuroumaru, Kashiwara (JP); Noboru Minamoto, Kashihara (JP)

(73) Assignee: Koyo Seiko., Ltd., Osaka (JP)

( * ) Notice: Subject to any disclaimer, the term of this patent is extended or adjusted under 35 U.S.C. 154(b) by 0 days.

(21) Appl. No.: 09/925,968

(22) Filed: Aug. 10, 2001

(65) Prior Publication Data

US 2002/0023515 A1 Feb. 28, 2002

(30) Foreign Application Priority Data

Aug. 11, 2000 (JP) ........................................ 2000-244877
Sep. 12, 2000 (JP) ........................................ 2000-276854

(51) Int. Cl.[7] ................................................ B62D 1/18
(52) U.S. Cl. ............................ 74/493; 74/567; 280/775
(58) Field of Search ................... 79/493, 527; 280/775, 280/776; 74/56, 107, 99 A; 403/373, 374.1, 374.2, 374.3, 374.4, 374.5, 367, 368; B62D 1/18

(56) References Cited

U.S. PATENT DOCUMENTS 3,238,797 A * 3/1966 Coughren ...................... 74/55
5,377,555 A * 1/1995 Hancock ...................... 74/493
5,392,667 A * 2/1995 Courvoisier ................. 74/493
5,743,150 A * 4/1998 Fevre et al. .................. 74/493

FOREIGN PATENT DOCUMENTS

| JP | 6-219283 | | 8/1994 | | |
| JP | 9-11912 | | 1/1997 | | |
| JP | 2000-21153 A | * | 8/2000 | ............ | B62D/1/18 |

* cited by examiner

Primary Examiner—David A. Bucci
Assistant Examiner—Bradley J. Van Pelt
(74) Attorney, Agent, or Firm—Rabin & Berdo, P.C.

(57) ABSTRACT

A tilt steering apparatus comprises a lock lever rotatable around the axis of a supporting shaft. When a lock lever is rotated around the axis of the supporting shaft, a cam surface is rotated relative to a cam follower. As a result, the cam surface presses the cam follower against side plates of a fixed bracket, thereby achieving tilt locking. The cam surface has a plurality of slopes corresponding to a rotation stroke position of the lock lever. The operating torque of the lock lever at the time of a locking operation is reduced without increasing the range of the operating angle of the lock lever.

8 Claims, 11 Drawing Sheets

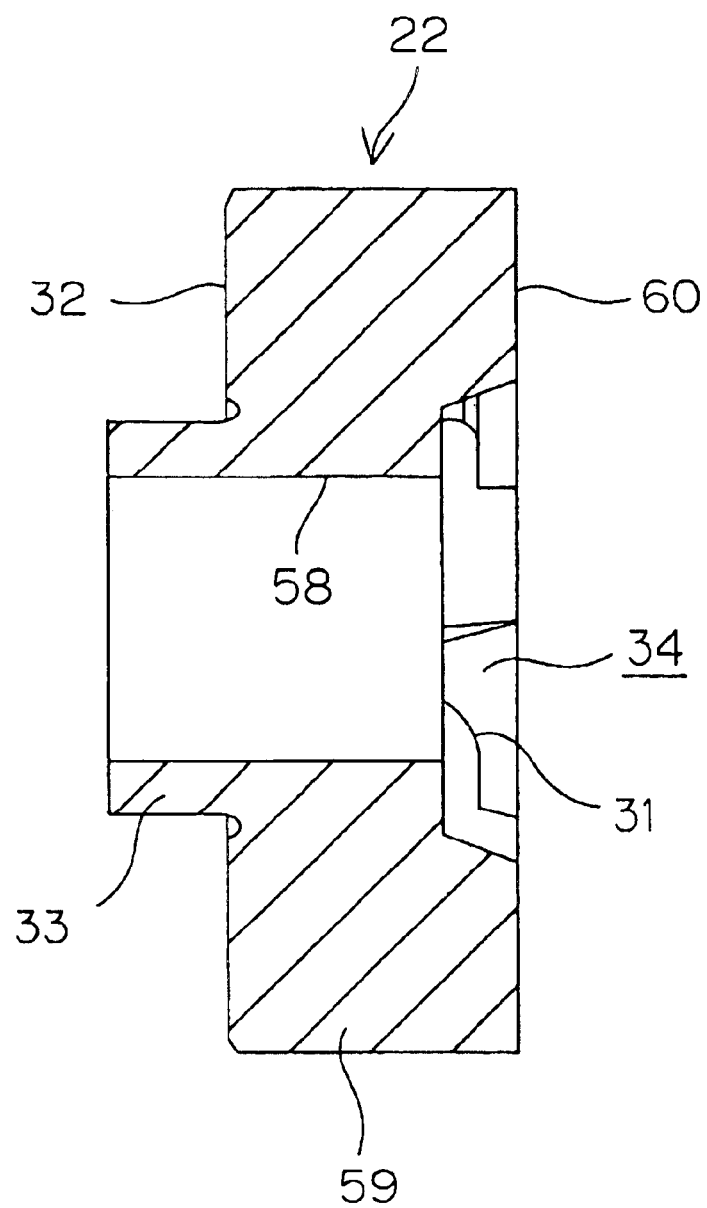

TILT STEERING APPARATUS

CROSS REFERENCE TO RELATED APPLICATION

The application claims priority benefits under 35 USC § 119 of Japanese Patent Application Serial No. 2000-244877 filed on Aug. 11, 2000 and Japanese Patent Application Serial No. 2000-276854 filed on Sep. 12, 2000, the disclosures of which are incorporated by reference.

BACKGROUND OF THE INVENTION

1. Field of the Invention

The present invention relates to a tilt adjustable tilt steering apparatus.

2. Description of Related Arts

There is a tilt steering apparatus so adapted that the height of a steering wheel can be changed depending on the physical constitution of a driver, the driving position, or the like. An example is a telescopically adjustable tilt steering apparatus in which the position of a steering wheel is adjusted along the axis of a steering shaft.

Conventionally, there has been provided as the tilt steering apparatus one comprising a fixed bracket fixed to a vehicle, a tilt bracket fixed to a steering column, a supporting shaft penetrating side plates of the fixed bracket and the tilt bracket, a lock lever manually rotated around the axis of the supporting shaft, and a cam mechanism for pressing the side plates of both the brackets as the lock lever is rotated in the locking direction to achieve tilt locking.

However, the operating torque of the lock lever in a case where the tilt locking is achieved is increased. On the other hand, the operating torque of the lock lever in a case where the tilt locking is released is small, so that a feeling of operation is bad.

The present invention has been made in view of the above-mentioned problems, and has as its object to provide a tilt steering apparatus capable of obtaining a suitable operating torque of a lock lever and having good operability.

SUMMARY OF THE INVENTION

In order to attain the above-mentioned object, in a preferred mode of the present invention, a tilt steering apparatus comprising a tilt adjustable steering column comprises a fixed bracket fixed to a body of a vehicle; a tilt bracket fixed to the steering column; a side plate provided in the fixed bracket; a side plate provided in the tilt bracket and sliding along the side plate of the fixed bracket at the time of tilt adjustment; a supporting shaft passing through respective insertion holes of the side plates of the fixed bracket and the tilt bracket; a lock lever rotatable in the locking direction and the locking releasing direction around an axis of the supporting shaft and rotated in the locking direction to lock the steering column to an adjusted tilt position; and a cam surface and a cam follower which are relatively rotated while being brought into sliding contact with each other as the lock lever is rotated. The cam surface includes a plurality of slopes corresponding to a rotation stroke position of the lock lever. The cam surface presses the cam follower as the lock lever is rotated in the locking direction so that the side plates of both the brackets are pressed against each other, resulting in the steering column being locked at the adjusted tilt position.

In this mode, the operating force of the lock lever in a case where the lock lever is locked can be reduced without making the range of the operating angle of the lock lever so large by providing the plurality of slopes.

It is preferable that the tilt steering apparatus further comprises means for increasing the operating torque of the lock lever at the front of a stroke in the locking releasing direction of the lock lever, the cam surface and the cam follower constituting means for increasing the operating torque of the lock lever.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a cross-sectional view of a cam in a tilt steering apparatus according to another embodiment of the present invention;

DETAILED DESCRIPTION OF THE PREFERRED EMBODIMENT

A preferred embodiment of the present invention will be described while referring to accompanying drawings.

Figure 1:
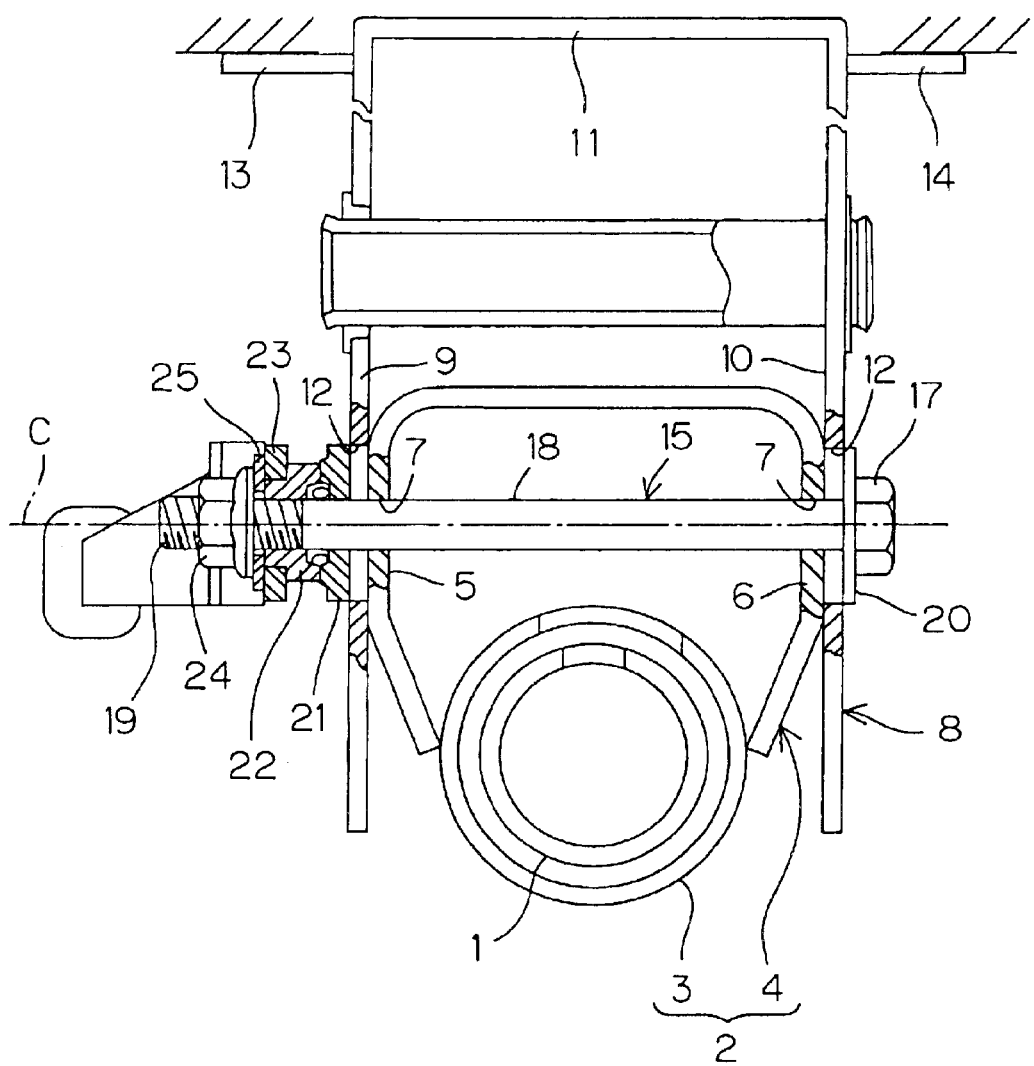
FIG. 1 is a partially broken front view of a tilt steering apparatus according to an embodiment of the present invention.
Figure 2:
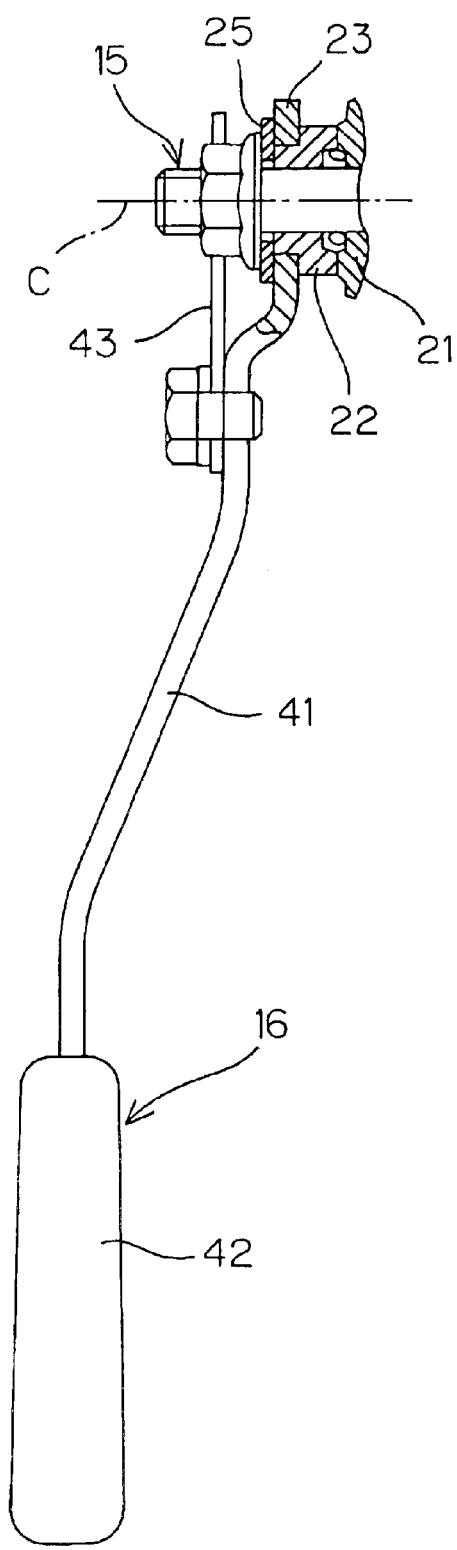
FIG. 2 is a partially broken side view of a lock lever and a portion to which the lock lever is attached.

FIG. 1 is a longitudinal sectional view of a steering column in a tilt telescopic steering apparatus according to an embodiment of the present invention, and FIG. 2 is a partially broken side view of a lock lever and a portion to which the lock lever is attached. Referring to FIG. 1, a tilt telescopic steering apparatus (hereinafter merely referred to as a steering apparatus) comprises a steering column 2 for supporting a steering shaft 1 having a steering wheel fixed to its upper end in the axial direction so as to be rotatable.

The steering column 2 comprises a tube 3 (corresponding to an upper jacket) for supporting the steering shaft 1 so as to be rotatable and a tilt bracket 4 fixed to the tube 3. The tilt bracket 4 is in a groove shape opening downward. A vertically long hole 7 extending along the length of the steering column 2 is formed in left and right side plates 5 and 6 of the tilt bracket 4.

A fixed bracket 6 is fixed to a vehicle, and is in the shape of a groove opening downward. Bracket 8 comprises a pair of side plates 9 and 10 opposite to each other and an upper plate 11 connecting intermediate portions at upper ends of the side plates 9 and 10 to each other. A vertically long hole 12 in the shape of a circular arc is formed in each of the side plates 9 and 10. Reference numerals 13 and 14 denote mounting stays formed by folding upper edges of parts of the side plates 9 and 10 outward. The fixed bracket 8 is fixed to the vehicle by a bolt passing through a screw insertion hole formed in each of the mounting stays 13 and 14, which is not illustrated.

A tilt center axis is supported in a supporting hole composed of a round hole provided in each of the side plates 9 and 10 of the fixed bracket 8, and a lower end in the axial direction of the steering column 2 is supported around the tilt center axis so as to be slidable, which is not illustrated. Telescopic adjustment can be made by displaying the tilt center axis backward and forward in a long hole provided in each of the side plates 5 and 6 of the tilt bracket 4 in the steering column 2.

Reference numeral 15 denotes a supporting shaft integrally inserted through the side plates 9 and 10 of the fixed bracket 8 and the side plates 5 and 6 of the tilt bracket 4. The supporting shaft 15 is for supporting a lock lever serving as an operation lever manually operated in order to achieve tilt and telescopic locking and release the locking so as to be integrally rotatable.

Referring to FIG. 2, the lock lever 16 has a longitudinal main unit 41. A connecting section 23 connected to a cam 22, described later, so as to be integrally rotatable is provided at one end of the main unit 41, and a grip 42 to be griped by a driver is provided at the other end of the main unit 41. Reference numeral 43 is a stopper plate which is screwed to the vicinity of one end of the main unit 41 to abut against a nut 24. The stopper plate 43 prevents the nut 24 from turning. In FIG. 2, reference numeral 21 denotes a cam follower engaged with the cam 22, and reference numeral 25 denotes a shim.

Referring to FIG. 1 again, the supporting shaft 15 is guided in the vertically long hole 12 so that only vertical sliding is allowed with respect to the fixed bracket 8. On the other hand, the vertically long hole 7 prevents the steering column 2 including the tilt bracket 4 from moving back and forth with respect to the supporting shaft 15.

The supporting shaft 15 is composed of a bolt having a head 17, a body 18 composed of a circular cylinder, and a screw portion 19. The body 18 penetrates the side plates 5 and 6 of the bracket 4 and the side plates 9 and 10 of the bracket 8. A plain washer 20 is interposed between the head 17 and an outer surface of the side plate 10 of the fixed bracket 8.

On the other hand, the screw portion 19 of the supporting shaft 15 and a part of the body 18 connecting therewith project outward from the side plate 9 of the fixed bracket 8, and an annular cam follower 21 is fitted on a part of the body 18. The cam follower 21 is brought into contact with an outer surface of the side plate 9 of the fixed bracket 8. Further, the cam follower 21 has a projection inserted through the vertically long hole 12 of the side plate 9. Consequently, the rotation of the supporting shaft 15 around a center axis C is bound by the side plate 9 of the fixed bracket 8.

An annular cam 22 which is brought into contact with the cam follower 21 is fitted on the screw portion 19 so as to be relatively rotatable. The connecting section 23 of the lock lever 16 is connected to the cam 22 so that the lock lever 16 and the cam 22 are integrally rotated. A nut 24 with a flange is screwed into the screw portion 19. The nut 24 positions the cam 22 along the axis of the supporting shaft 15 through the annular shim 25 and the connecting section 23 of the lock lever 16. The inner periphery of the annular connecting section 23 may be in a polygonal shape such as a hexagonal shape or a shape having a width across flat on its circumference.

The shim 25, the connecting section 23, the cam 22, and the cam follower 21 are interposed between the side plate 9 of the fixed bracket 8 and the nut 24. When the lock lever 16 is rotated, the cam 22 is rotated relative to the cam follower 21, so that the cam follower 21 is pressed against the side plate 9 upon advancing and retreating along the center axis C of the supporting shaft 15 or the pressing thereof is released, thereby achieving tilt locking and telescopic locking and releasing the locking.

Figure 3A:
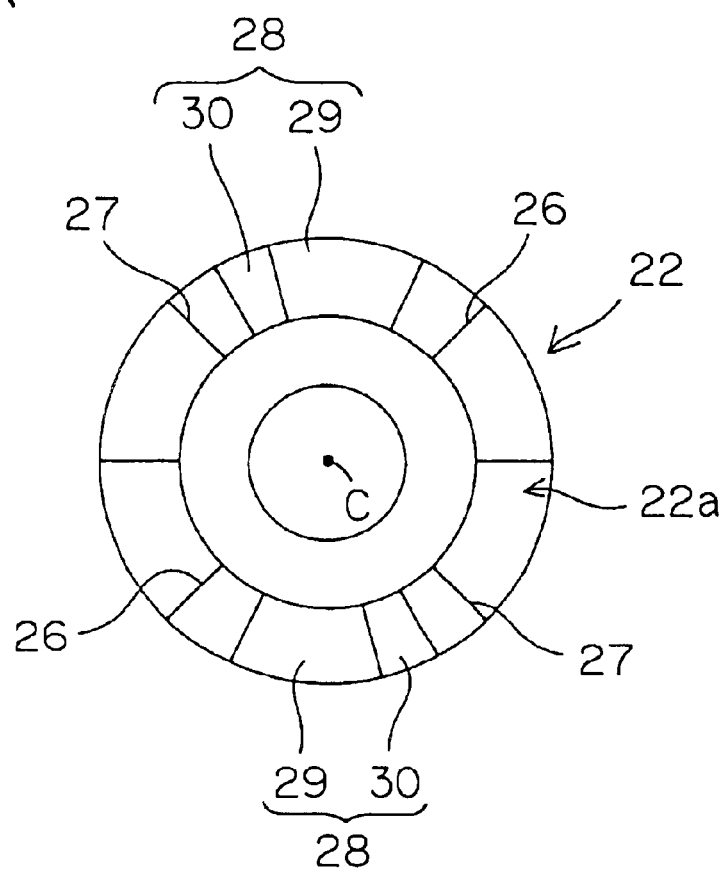
FIG. 3A is a front view of a cam including a cam surface.

As shown in FIG. 3A, a pair of a first positioning section 26 for positioning the cam follower 21 at the time of releasing locking, and a second positioning section 27 for positioning the cam follower 21 at the time of locking are provided so as to be opposite to each other with a center axis of the cam 22 (i.e., the center axis C of the supporting shaft 15) on a surface 22a, opposite to the cam follower 21, of the cam 22.

Figure 3B:
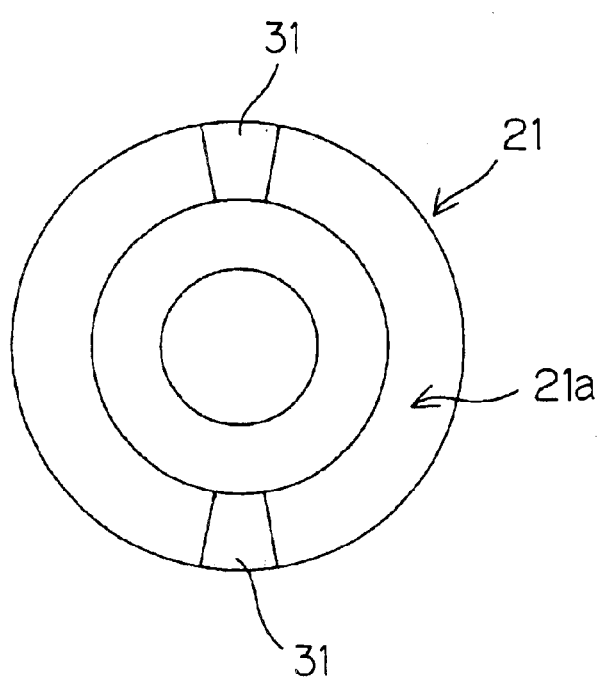
FIG. 3B is a front view of a surface of a cam follower opposite to the cam surface.
Figure 4:
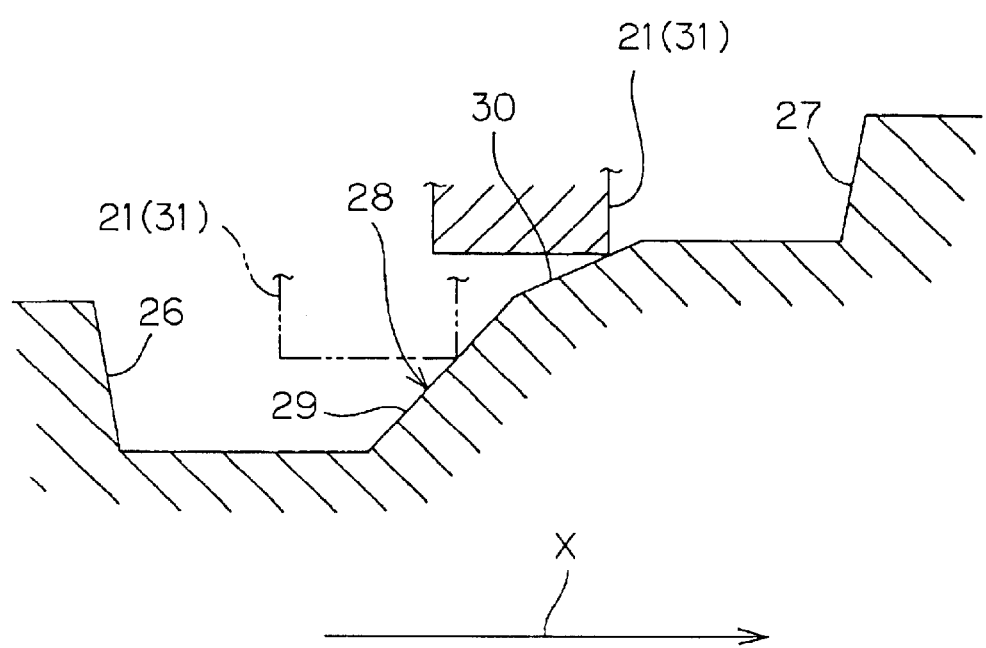
FIG. 4 is a cross-sectional view schematically showing a cam and a cam follower.

Referring to FIGS. 3A and 4, a cam surface 28 is formed between the first and second positioning sections 26 and 27 which correspond to each other. In FIG. 4, an arrow X indicates the direction in which the cam follower 21 moves relative to the cam 22 when the lock lever 16 is stroked in the locking direction. On the other hand, as shown in FIG. 3B, the positioning sections 26 and 27 of the cam 22 and a pair of projections 31 in the shape of a stand which are brought into sliding contact with a cam surface 28 are formed on a surface 21a, opposite to the cam 22, of the cam follower 21.

As shown in FIG. 4, the cam surface 28 comprises a first slope 29 relatively steeply inclined and a second slope 30 relatively gently inclined, and the second slope 30 corresponds to the rear of a stroke in the locking direction of the lock lever. The adjacent slopes are connected together at a protruding portion that projects toward the cam follower.

According to the present embodiment, the plurality of slopes 29 and 30 are provided on the cam surface 28, thereby making it possible to reduce the operating force of the lock lever 16 without so enlarging the operating angle of the lock lever 16.

Particularly, the cam surface 28 is provided with the second slope 30 relatively gently inclined in correspondence with the rear of a stroke in the fastening direction of the lock lever 16 whose operating torque is liable to be increased.

Consequently, the lever ratio of the lock lever at the rear of the fastening stroke (corresponding to the ratio of the amount of displacement of the cam follower 21 to the increment of the operating angle of the lock lever) can be increased. As a result, the operating torque can be reduced, thereby making it possible to significantly improve the operability of the lock lever 16.

In the above-mentioned embodiment, the cam surface may be provided with three or more slopes which differ in inclination, for example. In order to smooth the operation, the adjacent slopes may be continued by a smooth curve, or the whole of the slopes may be a smooth curve.

Referring now to FIG. 5, the cam 22 has a cylindrical main unit 59 having a center hole 58 through which the supporting shaft 15 is inserted. In the main unit 59, a cam surface 31 is formed on its opposite surface 60 corresponding to the cam follower 21, and a connecting boss 33 is formed on a rear surface 32 of the opposite surface 60. A pair of flat surfaces having a width across flat, for example, is formed on a peripheral surface of the connecting boss 33. The flat surfaces are engaged with the connecting section 23 of the lock lever 16, so that the lock lever 16 and the cam 22 can be integrally rotated.

Figure 6A:
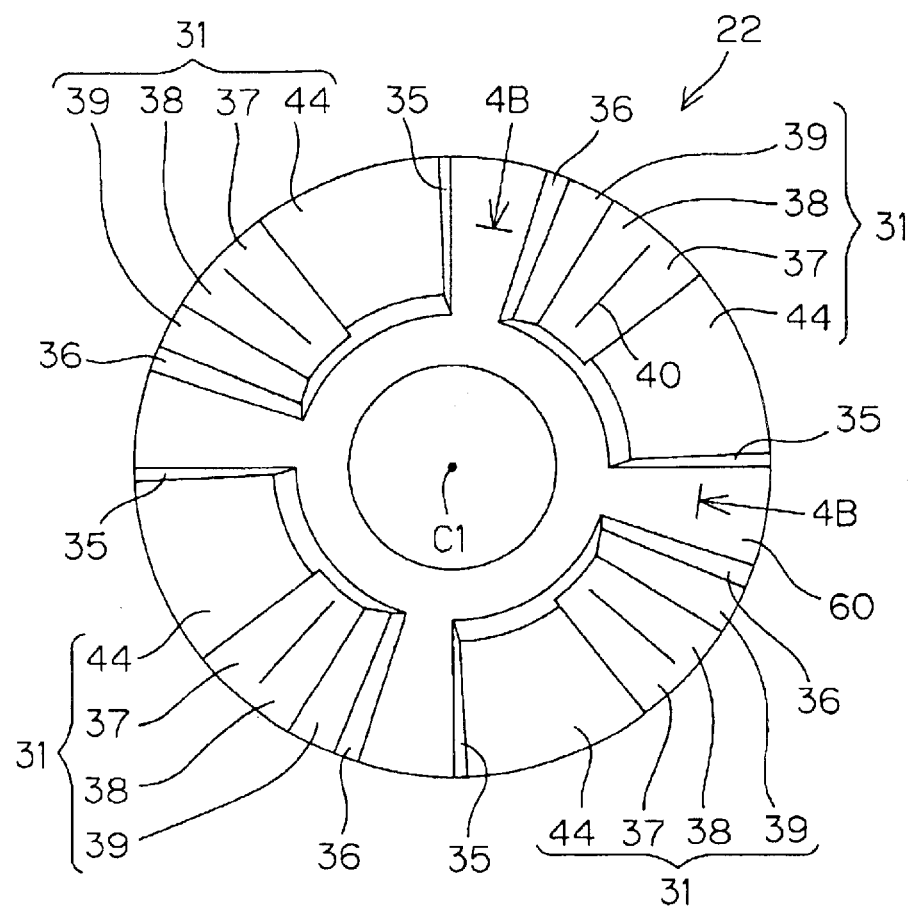
FIG. 6A is a front view of a surface, opposite to a cam follower, of the cam shown in FIG. 5.

Referring to FIG. 5 and FIG. 6A which is a front view of the opposite surface 60, a plurality of recesses 34 forming a fan shape which are equally spaced in the circumferential direction are formed on the opposite surface 60, and a bottom surface of each of the recesses 34 forms a cam surface 31.

Figure 6B:
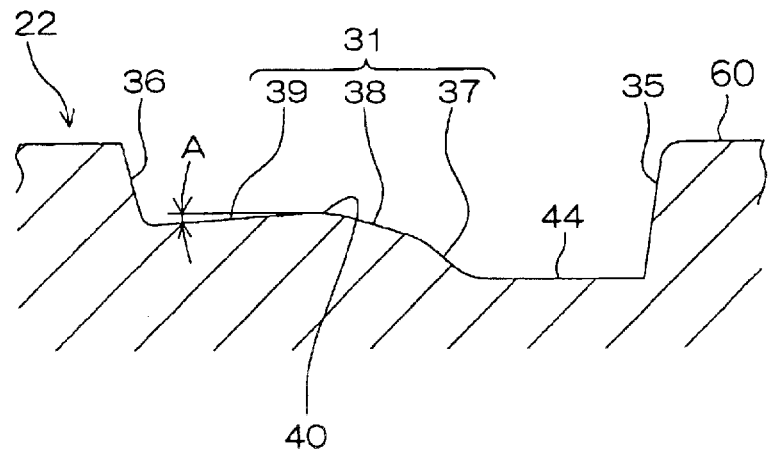
FIG. 6B is a cross-sectional view taken along a line 6B—6B shown in FIG. 6A.

Referring to FIGS. 6A and 6B, one of a pair of inner sidewalls of the recess 34 opposite to the cam 22 in the circumferential direction constitutes a first positioning section 35 for positioning the cam follower 21 at the time of releasing locking, and the other thereof constitutes a second positioning section 36 for positioning the cam follower 21 at the time of locking.

Referring to FIG. 6B, the cam surface 31 is formed between the first and second positioning sections 35 and 36. The cam surface 31 comprises a flat portion 44, a first forward inclined slope 37 relatively steeply inclined, a second forward inclined slope 38 inclined more gently than the first slope 37, and a third slope 39 serving as an inverse slope inclined in the opposite direction to the first and second slopes 37 and 38. The adjacent slopes are continued by a smooth curve. The inverse slope constituting the third slope 39 constitutes means for increasing torque at the time of releasing, and constitutes a slope adjusting section for adjusting the operating torque of the lock lever at the time of fastening.

The third slope 39 is positioned at the rear of the fastening stroke of the lock lever. An angle of inclination A to a plane perpendicular to a center axis C1 of the cam 22 is set to approximately 1°, for example (which may be in the range of 0.50 to 1.5°), and a top (crest) 40 is formed between the second slope 38 and the third slope 39.

Figure 7A:
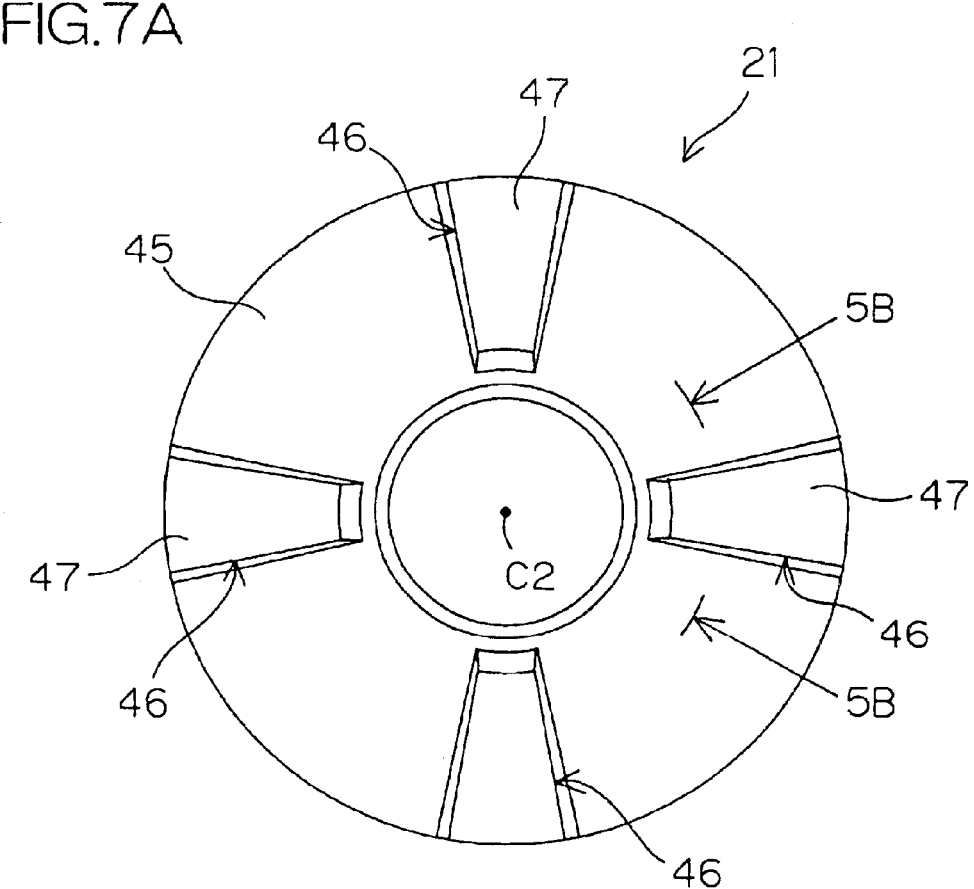
FIG. 7A is a front view of a cam follower surface opposite to the cam shown in FIG. 5.
Figure 7B:
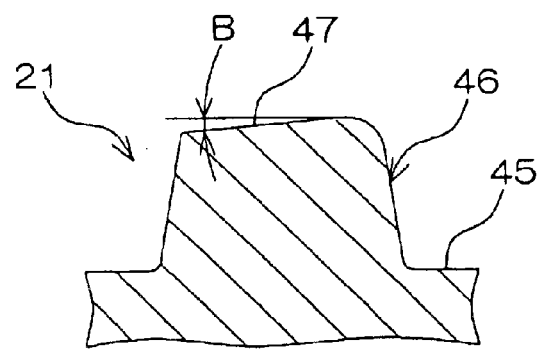
FIG. 7B is a cross-sectional view taken along a line 7B—7B shown in FIG. 7A.

On the other hand, referring to FIGS. 7A and 7B, a plurality of projections 46 forming a trapezoidal shape in cross section which are brought into sliding contact with the cam surface 31 of the cam 22 are equally spaced in the circumferential direction on a surface 45, opposite to the cam 22, of the cam follower 21. A cam follower surface 47 composed of a top surface of the projection 46 is inclined at an angle of inclination (B=A, which is 1°, for example) equal to that of the third slope 39 to a plane perpendicular to a center axis C2 of the cam follower 21. As shown in FIG. 7A, the cam follower surface 47 and the third slope 39 are inclined at an equal angle of inclination in opposite directions and are brought into surface contact with each other.

According to the present embodiment, the plurality of slopes 37, 38, and 39 are provided on the cam surface 28, thereby making it possible to reduce the operability of the lock lever 16 at the time of fastening without increasing the range of the operating angle of the lock lever 16.

Figure 8A:
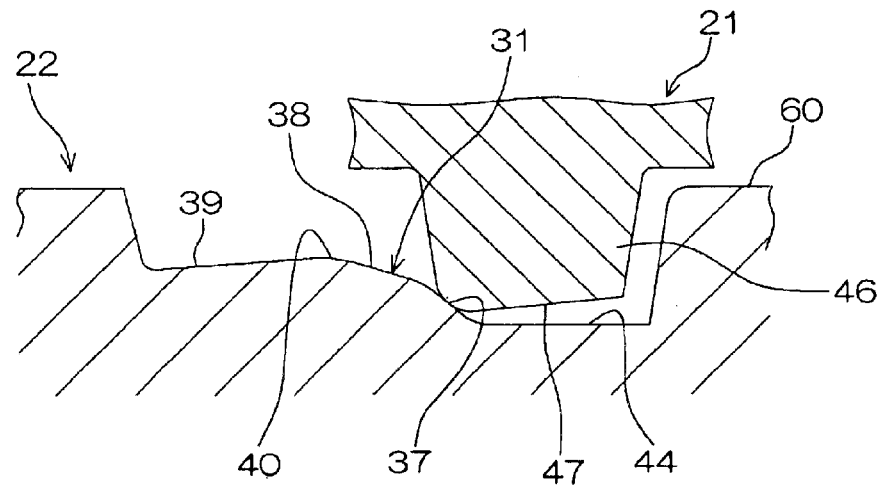
FIGS. 8A and 8B are cross-sectional views sequentially showing the operations of a cam and a cam follower in a case where a lock lever is fastened in order to achieve tilt locking in the embodiment shown in FIG. 5.
Figure 8B:
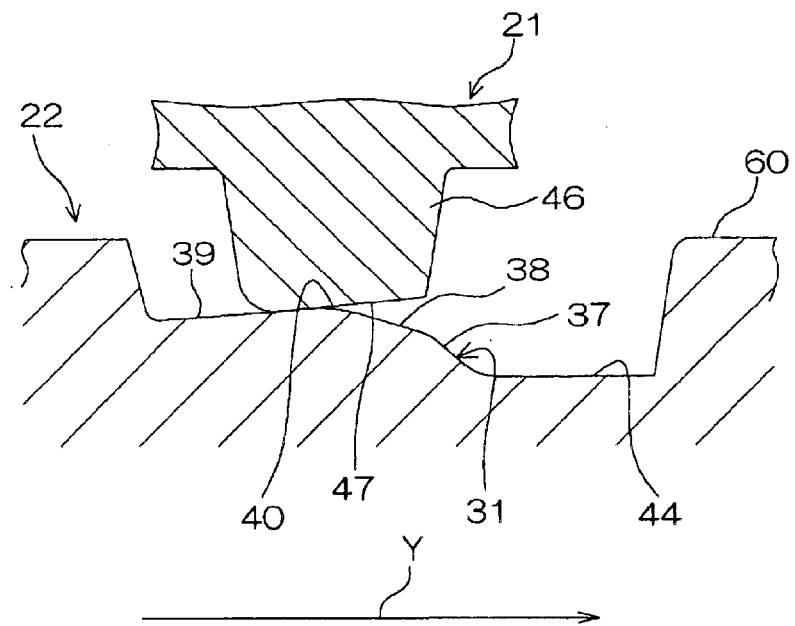

Particularly referring to FIGS. 8A and 8B, the third slope 39, serving as a slope adjusting section, which is slightly inclined inverse slope is provided on the cam surface 31 in correspondence with the rear of the stroke in the fastening direction of the lock lever 16 whose operating torque is liable to be increased. Consequently, the lever ratio of the lock lever at the rear of the fastening stroke (corresponding to the ratio of the amount of displacement of the cam follower 21 to the increment of the operating angle of the lock lever) can be increased. As a result, the operating torque can be reduced, thereby making it possible to significantly improve the operability of the lock lever 16. In FIG. 8B, an arrow Y indicates the direction of movement of the cam 22 relative to the cam follower 21 in a case where the lock lever 16 is operated in the locking direction.

Figure 9A:
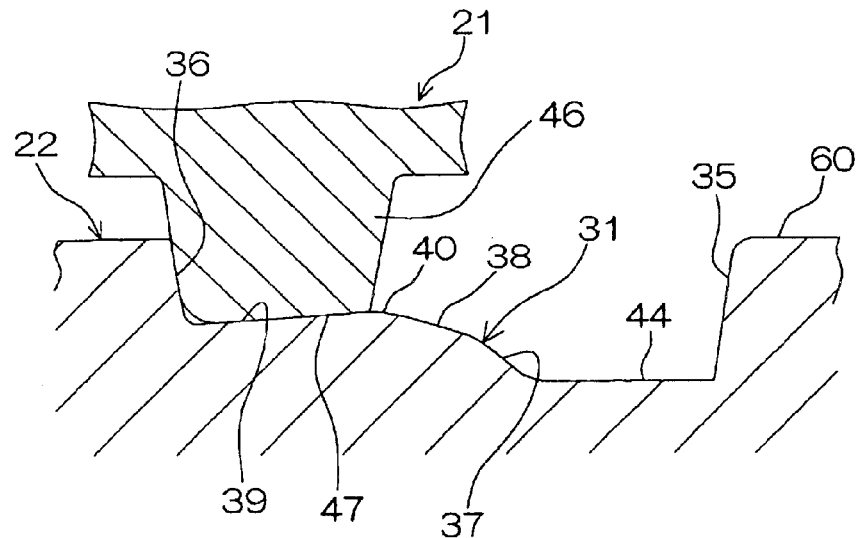
FIGS. 9A and 9B are cross-sectional views sequentially showing the operations of a cam and a cam follower in a case where a lock lever is loosened in order to release tilt locking in the embodiment shown in FIG. 5.
Figure 9B:
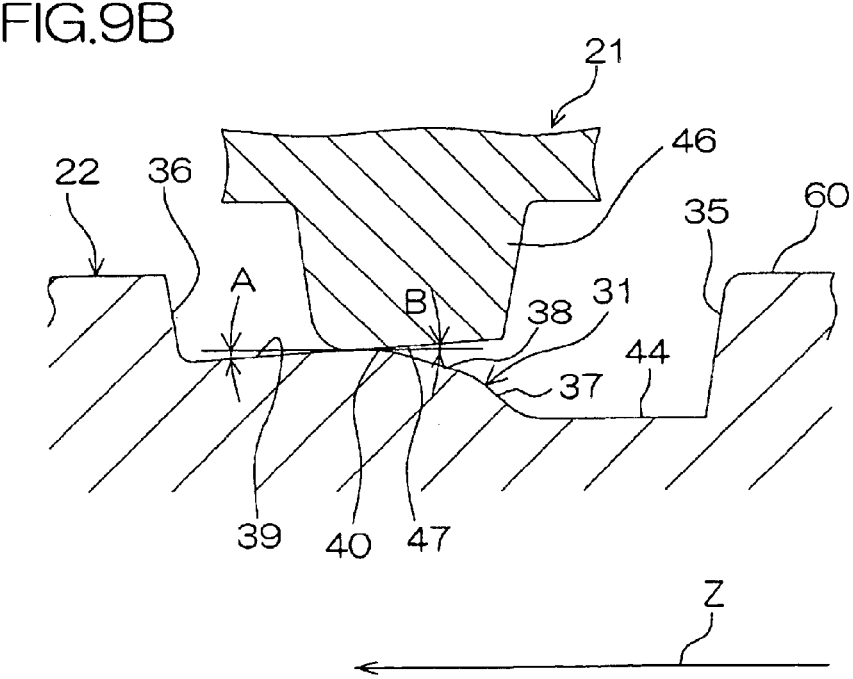

Moreover, as shown in FIGS. 9A and 9B, when the lock lever 16 is operated in the releasing direction, it must move beyond the top 40 during the transition from the third slope 39 serving as an inverse slope inclined in the opposite direction to the second slope 38. Accordingly, the operating torque at the time of releasing can be increased to improve a feel. In FIG. 9B, an arrow Z indicates the direction of movement of the cam 22 relative to the cam follower 21 in a case where the lock lever 16 is operated in the locking releasing direction.

Figure 10:
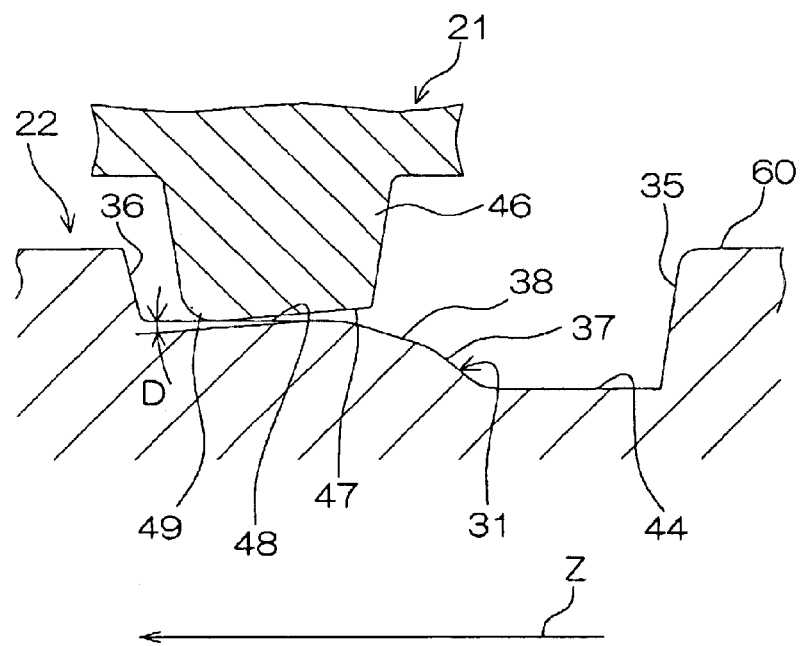
FIG. 10 is a cross-sectional view of a cam and a cam follower in another embodiment of the present invention.

FIG. 10 is a cross-sectional view schematically showing a cam and a cam follower in another embodiment of the present invention. Referring to FIG. 10, the present embodiment differs from the embodiment shown in FIG. 9A in that the third slope 39 in the embodiment shown in FIG. 9A is inclined in the opposite direction to the first and second slopes 37 and 38, while a third slope 48 serving as a slope adjusting section in the present embodiment is made inclined in the same direction as first and second slopes 37 and 38 (that is, forward inclined). An angle of inclination D of the third slope 48 is set to 1° (which may be in the range of 0.5° to 1.5°). In the present embodiment, the cam follower surface 47 constitutes means for increasing torque at the time of releasing. Other constituent elements are the same as those in the embodiment shown in FIG. 9A, and are assigned the same reference numerals and hence, the description thereof is not repeated.

According to the present embodiment, the same function and effect as those shown in FIG. 9A, and the operating force of the lock lever 16 at the time of fastening can be reduced.

The third slope 48 and the cam follower 47 are inclined in opposite directions, and their respective angles of inclination are made different from each other (A≠B). When the lock lever 16 is operated in the direction in which locking is released, therefore, an edge 49 of a cam follower 47 serving as means for increasing torque at the time of releasing is cut into the third slope 48. Consequently, the operating torque at the time of releasing can be increased to improve a feeling of operation of the lock lever at the time of releasing. In the present embodiment, the cam follower surface 47 may be a portion having no slope.

The present invention is not limited to the above-mentioned embodiments. Various changed modes are considered.

Figure 11:
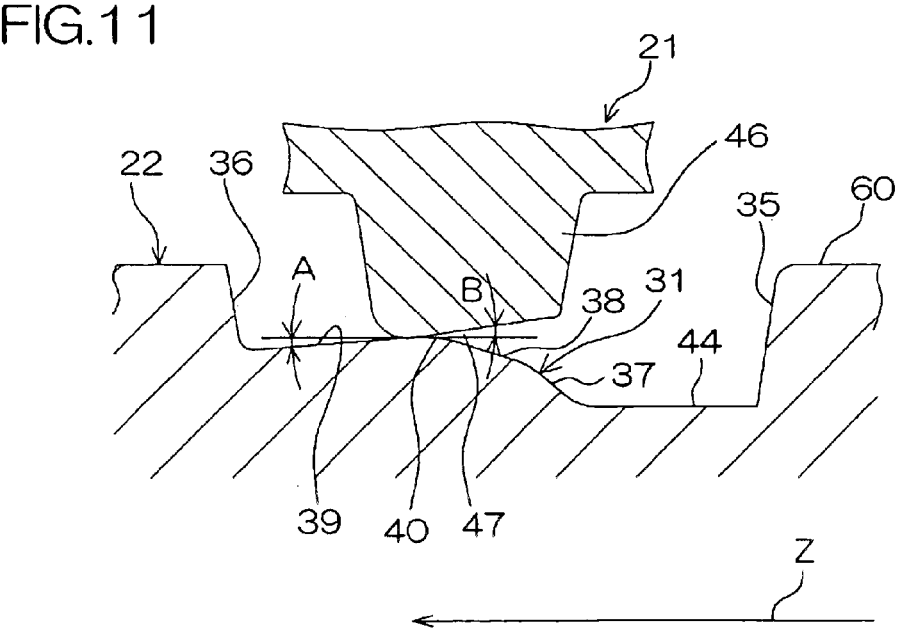
FIG. 11 is a cross-sectional view of a cam and a cam follower in still another embodiment of the present invention.

For example, in the embodiment shown in FIG. 9B, the cam follower surface 47 may be brought into contact with the third slope 39 of the cam surface 31 at an edge 49, as shown in FIG. 11, by making an angle of inclination B of the cam follower surface 47 larger than an angle of inclination A of the third slope 39 of the cam surface 31 (B>A).

Figure 12:
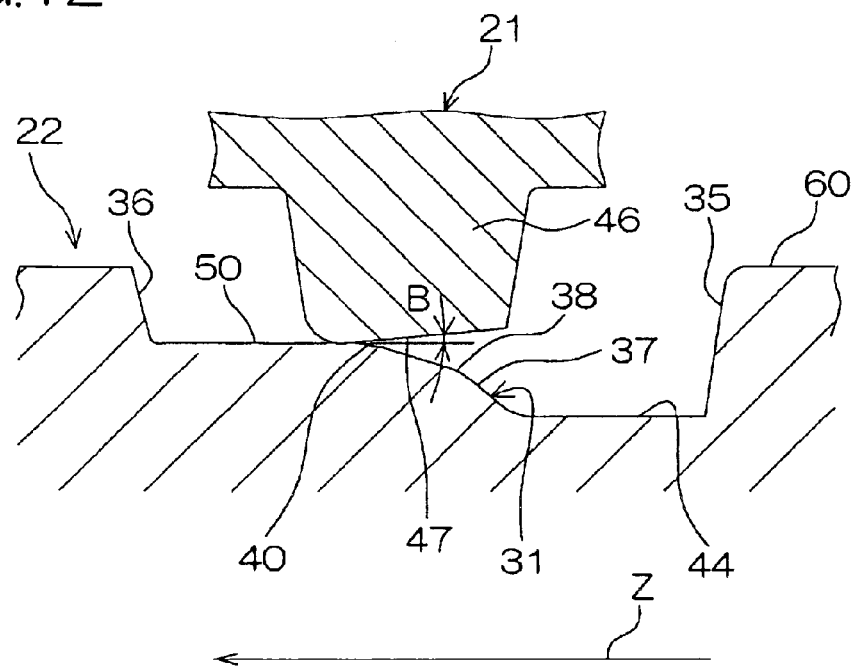
FIG. 12 is a cross-sectional view of a cam and a cam follower in a further embodiment of the present invention.

In the embodiment shown in FIG. 9B, a portion having no slope 50 serving as a slope adjusting section may be provided in place of the third slope 39 of the cam surface 31, as shown in FIG. 12, by reducing the angle of inclination of the third slope 39 to zero (A=0).

Figure 13:
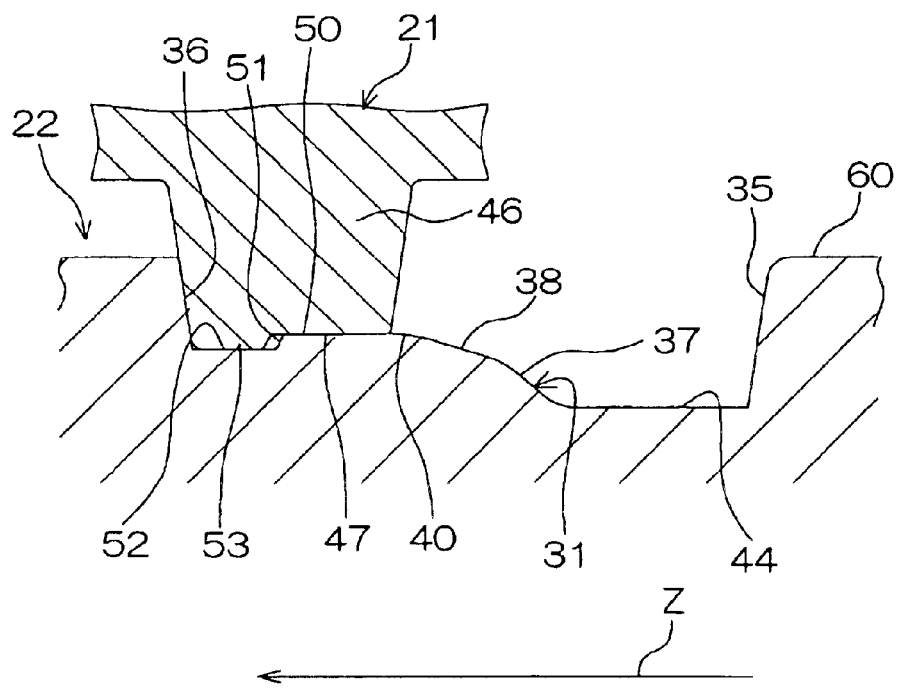
FIG. 13 is a cross-sectional view of a cam and a cam follower in a still further embodiment of the present invention.

In an embodiment shown in FIG. 13, a recess 52 concaved by providing a step 51 may be provided at the rear of a fastening stroke of the portion having no slope 50. As shown in FIG. 13, the angle of inclination B of the cam follower surface 47 may be also reduced to zero (B=0) to have no slope, and a projection 53 fitted in the recess 52 may be provided at the rear of the fastening stroke of the cam follower surface 47. Also in this case, when the lock lever 16 is operated in the releasing direction, the projection 53 moves beyond the step 51, so that contact surface pressure between the cam surface 31 and the cam follower surface 47 is increased once, thereby making it possible to increase the operating torque at the time of a lock releasing operation.

In each of the embodiments, the cam surface may be provided with a larger number of slopes which differ in inclination. Further, in order to smooth the operation, the adjacent slopes (or the slope and the portion having no slope) may be continued by a smooth curve, or the whole of the slopes may be a smooth curve.

In each of the embodiments, the relationship between the cam surface and the cam follower surface may be reversed.

The present invention may be applied to a tilt steering apparatus having no telescopic adjusting function. In addition thereto, various changes can be made in the range of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tilt steering apparatus for a tilt adjustable steering column, comprising:
    a fixed bracket fixed to a body of a vehicle, and having side plates;
    a tilt bracket fixed to the steering column and having side plates positioned to slide along the side plates of the fixed bracket at a time of tilt adjustment;
    a supporting shaft passing through respective insertion holes of the side plates of the fixed bracket and of the side plates of the tilt bracket;
    a lock lever rotatable around an axis of said supporting shaft and in a locking direction to lock the steering column in an adjusted tilt position, and being rotatable around the axis of said supporting shaft and in a locking releasing direction; and
    a cam surface and a cam follower which are relatively rotated to cause an edge of the cam follower to be brought into sliding, and non-rolling contact with the cam surface as the lock lever is rotated,
    the cam surface including a locking position in which the steering column is locked in the adjusted tilt position, a releasing position in which the steering column is unlocked so as to be free to be adjusted to a desired tilt position, and an intermediate position disposed between the locking position and the releasing position, the intermediate position including a plurality of slopes including at least two linear and adjacent slopes corresponding to a rotation stroke position of the lock lever, the at least two slopes sloping upward in a same direction and being connected together at a protruding portion that projects toward the cam follower,
    the cam surface pressing the edge of the cam follower as the lock lever is rotated in the locking direction so that the side plates of the fixed bracket and the side plates of the tilt bracket are pressed against each other, resulting in the steering column being locked at the adjusted tilt position, wherein
    the cam follower is moved in a first direction relative to the cam surface when the lock lever is rotated in the locking direction,
    the at least two slopes slope upward in the first direction, a second one of the two slopes being gentler than a first one of the two slopes, and
    the cam follower slides from the first slope of the cam surface to the second slope thereof when the lock lever is rotated in the locking direction.

2. The tilt steering apparatus according to claim 1, wherein
    the plurality of slopes of the cam surface includes a third slope which slopes upward in the first direction, the third slope being gentler than the second slope, and the third slope corresponds to a rear of a stroke in the locking direction of the lock lever, and
    the cam follower successively slides toward the first, second and third slopes of the cam surface in this order when the lock lever is rotated in the locking direction.

3. The tilt steering apparatus according to claim 1, wherein
    the plurality of slopes of the cam surface includes an inverse slope which slopes downward in the first direction,
    the inverse slope corresponds to a rear of a stroke in the locking direction of the lock lever, and
    the cam follower slides toward the first and second slopes and the inverse slope of the cam surface in this order when the lock lever is rotated in the locking direction.

4. The tilt steering apparatus according to claim 1, further comprising:
    means for increasing an operating torque of the lock lever at a front of a stroke in the locking releasing direction of the lock lever, and
    wherein the cam surface and the cam follower constitute means for increasing the operating torque of the lock lever.

5. The tilt steering apparatus according to claim 4, wherein
    the cam follower is moved in a first direction relative to the cam surface when the lock lever is rotated in the locking direction,
    the cam surface includes an inverse slope which slopes downward in the first direction, and
    the inverse slope of the cam surface corresponds to a front of a stroke in the locking releasing direction of the lock lever.

6. The tilt steering apparatus according to claim 4, wherein
    the cam surface includes an area corresponding to a front of a stroke in the locking releasing direction of the lock lever, and a recess concaved by providing a step in the area.

7. The tilt steering apparatus according to claim 6, wherein the cam follower includes a cam follower surface which is brought into contact with the cam surface, and the cam follower surface includes a projection which is engaged with the recess of the cam surface in correspondence with a rear of a stroke in the locking direction of the lock lever.

8. The tilt steering apparatus according to claim 6, wherein an area, corresponding to the front of the stroke in the locking releasing direction of the lock lever, of the cam surface includes a portion having no slope.

* * * * *